Dec. 3, 1935.                J. C. BACKE                2,023,353
                          AUTOMOBILE WHEEL
                         Filed March 9, 1935            2 Sheets-Sheet 1
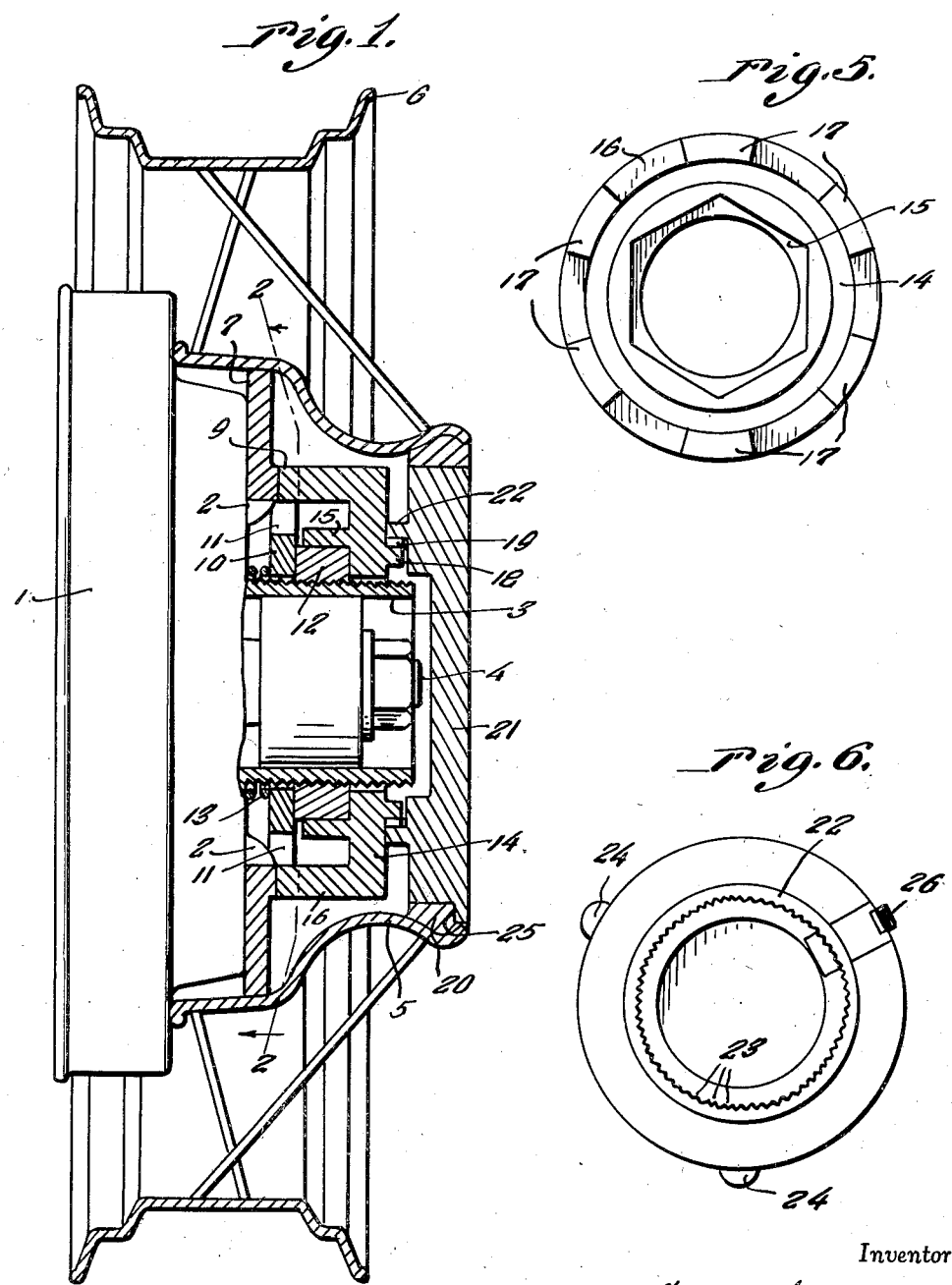
Inventor
John C. Backe
By Clarence A. O'Brien
Attorney Dec. 3, 1935.  J. C. BACKE  2,023,353
AUTOMOBILE WHEEL
Filed March 9, 1935  2 Sheets-Sheet 2
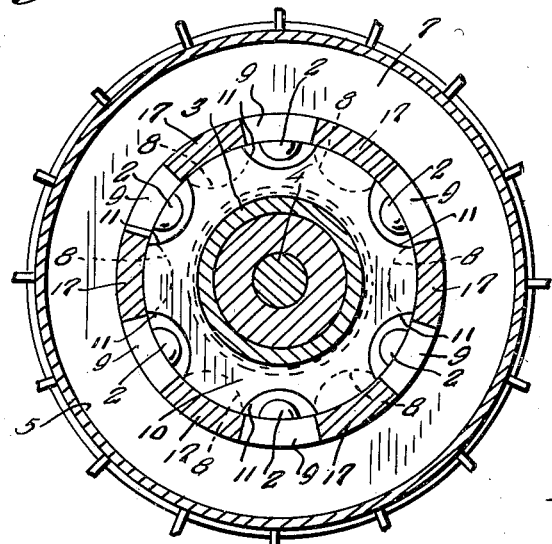
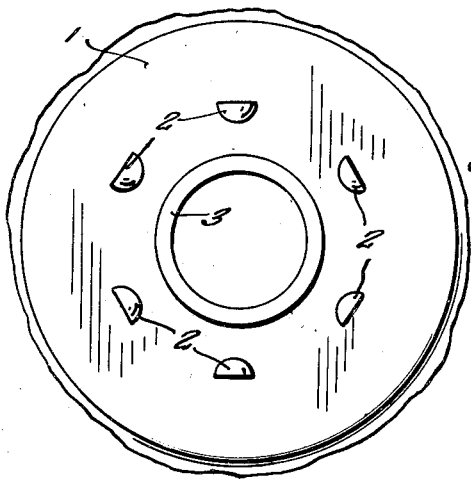
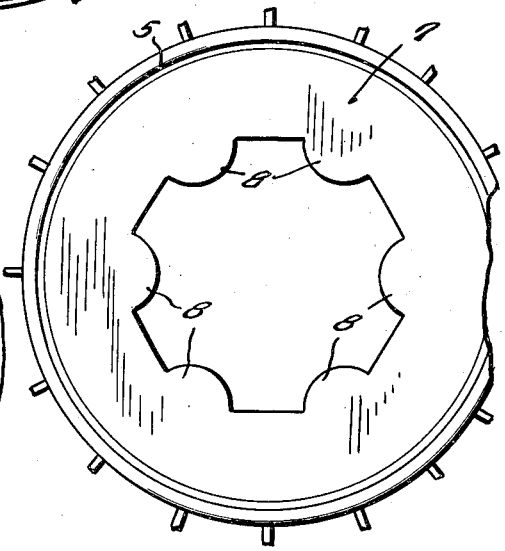
Inventor
John C. Backe
By Clarence A. O'Brien
Attorney Patented Dec. 3, 1935

2,023,353

UNITED STATES PATENT OFFICE 2,023,353

AUTOMOBILE WHEEL

John C. Backe, Howell, Mich.

Application March 9, 1935, Serial No. 10,311

4 Claims. (Cl. 301—9)

The present invention relates to new and useful improvements in wheels for vehicles, particularly automobiles, and has for its primary object to provide novel securing means whereby the wheel may be expeditiously but safely mounted on the hub and removed with a minimum of labor.

Other objects of the invention are to provide a securing means for the wheels of automobiles and other vehicles which will be comparatively simple in construction, strong, durable, reliable, compact and which may be manufactured at low cost.

The foregoing and other objects and advantages of the invention will become apparent from a study of the following specification, taken in connection with the accompanying drawings wherein like characters of reference designate corresponding parts throughout the several views, and wherein:—

Figure 1 is a view principally in vertical section through an automobile wheel embodying the present invention.

Figure 2 is a vertical sectional view, taken substantially on the line 2—2 of Figure 1, looking in the direction indicated by the arrows.

Figure 3 is a view in side elevation of a portion of the brake.

Figure 4 is an elevational view of the wheel hub, looking at the inner side thereof.

Figure 5 is a detail view of the nut lock.

Figure 6 is a detail view of the hub cap, looking at the inner side thereof.

Referring now to the drawings in detail, it will be seen that the embodiment of the present invention which has been illustrated comprises a brake drum 1 which is provided, on its outer face, with a plurality of substantially segmental lugs 2, as best seen in Figure 3 of the drawings. The reference numeral 3 designates an externally threaded inner hub which projects centrally from the brake drum 1, as usual. Of course, the hub 3 is mounted on an axle 4.

The reference numeral 5 designates the hub portion of a wheel 6 of the drop center type. Rigidly secured in any suitable manner in the wheel hub 5, as by welding, is a flat metallic ring 7 which is adapted to abut the outer face of the brake drum 1 and in which the lugs 2 are adapted to engage. The ring 7 is provided, on its inner periphery, with substantially segmental projections 8 (see Figure 4) which, when the wheel is mounted, extend between the lugs 2, as indicated in dotted lines in Figure 2 of the drawings. On its outer face and immediately adjacent its inner periphery, the ring 7 has formed thereon a plurality of projections or clutch teeth 9 the purpose of which will be presently set forth.

Slidably and rotatably mounted on the inner hub 3 is a retaining ring 10 which, when in operative position, is engaged with the projections 8 of the ring 7 for securing the wheel in position, said retaining ring 10 having substantially segmental recesses or notches 11 in its outer periphery which are adapted to be brought into alignment with said projections 8 when the wheel is being mounted or removed. A nut 12 which is threaded on the hub 3 secures the retaining ring 10 against the ring 7. A spring 13 is interposed between the brake drum 1 and the retaining ring 10 for yieldingly urging the latter outwardly.

The reference numeral 14 designates a lock which secures the nut 12 against rotation on the inner hub 3, said lock 14 including a polygonal socket 15 for the reception of said nut. The lock 14 further includes an annular flange 16 having teeth 17 on its free edge which are engageable with the teeth 9 of the ring 7. The lock 14 is further provided, on its outer face, with an annular flange 18 having external teeth 19 thereon.

A bushing 20 is permanently secured in any suitable manner in the outer portion of the wheel hub 5. The bushing 20 is for the reception of a removable cap 21 having an annular flange 22 on its inner face provided with internal teeth 23 (see Figure 6) for engagement with the teeth 19 of the lock 14, as shown to advantage in Figure 1 of the drawings. Lugs 24 project from the periphery of the cap 21 and seat in recesses 25 which are provided therefor in the bushing 20. The cap 21 further includes a suitable key retracted locking bolt 26 which is engageable in a socket (not shown) in the bushing 20. The cap 21 fits snugly in the bushing 20 and it will thus be seen that said cap is firmly secured in position.

To remove the wheel 6, the cap 21 is unlocked and removed, thus permitting removal of the lock 14. Access is thus had to the nut 12 which is backed off sufficiently to permit the retaining ring 10 to be rotated. The retaining ring 10 is then rotated to a position wherein the notches or recesses 11 therein are aligned with the projections 8 of the ring 7, thus permitting the wheel to be removed, the ring 7 passing over the retaining ring 10 and the nut 12. To mount the wheel the foregoing operation is substantially reversed.

It is believed that the many advantages of a vehicle wheel constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:

1. In a vehicle wheel including a brake drum and a threaded inner hub projecting centrally from said drum, lugs projecting from the drum coaxially with the inner hub, an outer hub, a ring fixed in said outer hub and engageable with the drum, the lugs being engageable in said ring, projections on the inner periphery of the ring engageable between the lugs, a retaining ring rotatably and slidably mounted on the inner hub and engageable with said projections, said retaining ring having recesses therein for the passage of the projections, a securing nut for the retaining ring threaded on the inner hub, and means for locking the nut against rotation on said inner hub.

2. In a vehicle wheel including a brake drum and a threaded inner hub projecting centrally from said drum, lugs projecting from the drum coaxially with the inner hub, an outer hub, a ring fixed in said outer hub and engageable with the drum, the lugs being engageable in said ring, projections on the inner periphery of the ring engageable between the lugs, a retaining ring rotatably and slidably mounted on the inner hub and engageable with said projections, said retaining ring having recesses therein for the passage of the projections, a securing nut for the retaining ring threaded on the inner hub, and means for locking the nut against rotation on said inner hub, said locking means including a socket member engageable with the nut, and coacting teeth on the locking means and on the first-named ring for retaining said locking means against rotation relative to the outer hub.

3. In a vehicle wheel including a brake drum and a threaded inner hub projecting from said drum, lugs projecting from the drum, an outer hub, a ring fixed in said outer hub and engageable with the drum, said lugs being engageable in said ring, a retaining ring rotatably and slidably mounted on the inner hub, projections on the inner periphery of the first named ring for engagement between the lugs, the retaining ring being engageable with the projections and having recesses therein for the passage of said projections, a securing nut for the retaining ring threaded on the inner hub, a socket member engaged with the nut, a cap removably secured in the outer hub, and interlocking teeth on the cap and on the socket member for securing the latter against rotation relative to the outer hub.

4. In a vehicle wheel including a brake drum and an externally threaded inner hub projecting centrally from said drum, lugs projecting from the drum coaxially with the inner hub, an outer hub, a ring fixed in said outer hub and engageable with the drum, projections on the inner periphery of the ring for engagement between the lugs, a retaining ring rotatably and slidably mounted on the inner hub and engageable with the projections, said retaining ring having recesses therein for the passage of the projections, a securing nut for the retaining ring threadedly mounted on the inner hub, a spring yieldingly urging the retaining ring outwardly on the inner hub, a socket member engaged with the nut for securing said nut against rotation on the inner hub, and means for locking said socket member against rotation relative to the outer hub.

JOHN C. BACKE.